United States Patent
Wold

(10) Patent No.: US 10,426,138 B2
(45) Date of Patent: Oct. 1, 2019

(54) CLEANFEEDER

(71) Applicant: CleanFeed, LLC, Jamaica Plain, MA (US)

(72) Inventor: Joseph S. Wold, Jamaica Plain, MA (US)

(73) Assignee: CleanFeed, LLC, Jamaica Plain, MA (US)

( * ) Notice: Subject to any disclaimer, the term of this patent is extended or adjusted under 35 U.S.C. 154(b) by 495 days.

(21) Appl. No.: 15/138,550

(22) Filed: Apr. 26, 2016

(65) Prior Publication Data

US 2017/0303506 A1    Oct. 26, 2017

(51) Int. Cl.
*A01K 13/00* (2006.01)
*A01K 5/01* (2006.01)

(52) U.S. Cl.
CPC .......... *A01K 13/001* (2013.01); *A01K 5/0114* (2013.01); *A01K 13/004* (2013.01)

(58) Field of Classification Search
CPC .. A01K 13/003; A01K 13/001; A01K 13/004; A01K 5/0114
USPC ...... 119/61.5, 602, 621, 622, 623, 652, 657, 119/663
See application file for complete search history.

(56) References Cited

U.S. PATENT DOCUMENTS

| | | | | |
|---|---|---|---|---|
| 1,095,471 A | * | 5/1914 | Sheldon | A01K 13/003 |
| | | | | 119/652 |
| 3,137,274 A | * | 6/1964 | Palmer | A01K 5/0114 |
| | | | | 119/657 |
| 4,055,150 A | * | 10/1977 | Williams | A01K 13/003 |
| | | | | 119/603 |
| 4,301,766 A | * | 11/1981 | Piccone | A01K 1/035 |
| | | | | 119/482 |
| 5,056,467 A | * | 10/1991 | Schaefer | A01K 13/003 |
| | | | | 119/666 |
| 5,195,455 A | | 3/1993 | van der Lely et al. | |
| 5,357,902 A | * | 10/1994 | Norval | A01K 5/01 |
| | | | | 119/657 |
| 5,782,206 A | | 7/1998 | Markewitz | |
| 5,785,004 A | * | 7/1998 | Hobbs | A01K 1/035 |
| | | | | 119/651 |
| 5,970,911 A | * | 10/1999 | van der Lely | A01J 5/0175 |
| | | | | 119/14.02 |
| 6,698,384 B2 | | 3/2004 | Markowitz | |
| 7,011,046 B1 | | 3/2006 | Kidwell | |
| 8,474,406 B2 | | 7/2013 | Weinblatt | |

(Continued)

FOREIGN PATENT DOCUMENTS

CN    201374950    1/2010
CN    203446341    2/2014

(Continued)

*Primary Examiner* — Lisa L Tsang
(74) *Attorney, Agent, or Firm* — Bethany R. Roahrig; James M. Weatherly; Cochran Freund & Young LLC

(57) ABSTRACT

An animal clean feeder device comprising a feeding structure having at least three sides, and at least one opening on one of the three sides, where the opening is large enough for a domestic animal to insert their head through. The feeder device also has a cleaning system which, when positioned on the feeding structure, allows the animal to clean their face as they move their head in and out of the opening on the feeding structure. Systems for cleaning an animal's face and a method for cleaning an animal's face are also included.

13 Claims, 7 Drawing Sheets

(56) References Cited

U.S. PATENT DOCUMENTS

| | | | | |
|---|---|---|---|---|
| 8,833,308 B1* | 9/2014 | Patterson | ............. | A01K 13/003 |
| | | | | 119/484 |
| 9,078,413 B1* | 7/2015 | Docy | ................... | A01K 13/001 |
| 9,241,777 B2 | 1/2016 | Ressemann et al. | | |
| 9,788,525 B1* | 10/2017 | Watchorn | ............. | A01K 13/004 |
| 2006/0005775 A1* | 1/2006 | Ritchey | ................ | A01K 5/0142 |
| | | | | 119/61.5 |
| 2008/0053379 A1 | 3/2008 | Markewitz | | |
| 2012/0222627 A1* | 9/2012 | Chura | ................... | A01K 13/004 |
| | | | | 119/622 |
| 2014/0326193 A1* | 11/2014 | Plummer | .................. | A01J 7/04 |
| | | | | 119/651 |
| 2016/0081300 A1* | 3/2016 | Harroff | ................ | A01K 13/003 |
| | | | | 119/650 |

FOREIGN PATENT DOCUMENTS

| | | |
|---|---|---|
| EP | 2775826 | 9/2015 |
| JP | 2001120096 | 5/2001 |
| NL | 1009895 | 2/2000 |
| RU | 2130253 | 5/1999 |
| UA | 33779 | 7/2008 |

\* cited by examiner

CLEANFEEDER

BACKGROUND

Maintaining good hygiene is important for domesticated animals, such as dogs and cats, as well as other domesticated animals. When domesticated animals eat or drink, they place their faces in a bowl or dish containing food or water. Often times excess water, slobber, and food particles are left on the animal's face and sides of the mouth after they eaten or taken a drink of water.

The foregoing examples of related art and limitations related therewith are intended to be illustrative and not exclusive, and they do not imply any limitations on the inventions described herein. Other limitations of the related art will become apparent to those skilled in the art upon a reading of the specification and a study of the drawings.

SUMMARY

The following embodiments and aspects thereof are described and illustrated in conjunction with systems, tools and methods, which are meant to be exemplary and illustrative, not limiting in scope. In various embodiments, one or more of the above-described problems have been reduced or eliminated, while other embodiments are directed to other improvements.

One embodiment comprises an animal clean feeder device comprising a feeding structure having a front face, a left side and an oppositely disposed right side, at least a first opening on the front face, wherein the first opening is large enough for a domestic animal to insert their head through the opening, a cleaning system, comprising at least one absorbent material and a means for positioning the absorbent material in a desired location, and a means for operably coupling the cleaning system to the structure.

One embodiment may further comprise a system for cleaning an animal's face comprising a structure having a front face, a left side and an oppositely disposed right side, at least a first opening on the front face, wherein the first opening is large enough for a domestic animal to insert their head through the opening, at least one container, wherein the container is positioned within the structure and in front of the first opening, a cleaning system, wherein the cleaning system comprises at least one absorbent material and a means for positioning the absorbent material in a desired location, and a means for attaching the cleaning system to said structure.

One embodiment may further comprise a method for cleaning an animal's face comprising providing an animal clean feeder device comprising a structure having a front face and at least two sides, wherein the at least two sides are oppositely disposed, at least a first opening on the front face, wherein the first opening is large enough for a domestic animal to insert their head through the opening, a cleaning system, wherein the cleaning system comprises at least one absorbent material and a means for positioning the absorbent material in a desired location, a means for attaching the cleaning system to said structure, and inducing an animal to insert their head through the at least first opening, causing the animal to wipe their face off on the absorbent material as they insert and remove their head from the at least first opening.

In addition to the example, aspects and embodiments described above, further aspects and embodiments will become apparent by study of the following descriptions, any one or all of which are within the invention. The summary above is a list of example implementations, not a limiting statement of the scope of the invention.

BRIEF DESCRIPTION OF THE DRAWINGS

The accompanying figures, which are incorporated herein and form a part of the specification, illustrate some, but not the only or exclusive, example embodiments and/or features. It is intended that the embodiments and figures disclosed herein are to be considered illustrative rather than limiting.

DETAILED DESCRIPTION

One or more embodiments of the present disclosure provide a clean feeder device, which allows for the cleaning of a domesticated animal's face after eating or drinking. As will be discussed in more detail, the clean feeder device functions by providing a feeding structure with at least one opening on at least one side of the feeding structure large enough for an animal, such as a dog or cat, to insert its head. A cleaning system is operably attached to the feeding structure in such a manner that allows the animal to insert their head into the opening but is also positioned so that the animal wipes their face on the absorbent material of the cleaning system as they remove their head from the opening. The cleaning system includes an absorbent material and a means for positioning the absorbent material in a desired location, such as across the opening. The cleaning system is operably attached to the feeding structure. The absorbent material provides a surface for the animal to wipe their face off as they insert and remove their head from the opening in the structure after being induced to do so, for example to eat or drink. The present disclosure also provides a system for cleaning an animal's face and a method for cleaning an animal's face.

Figure 1:
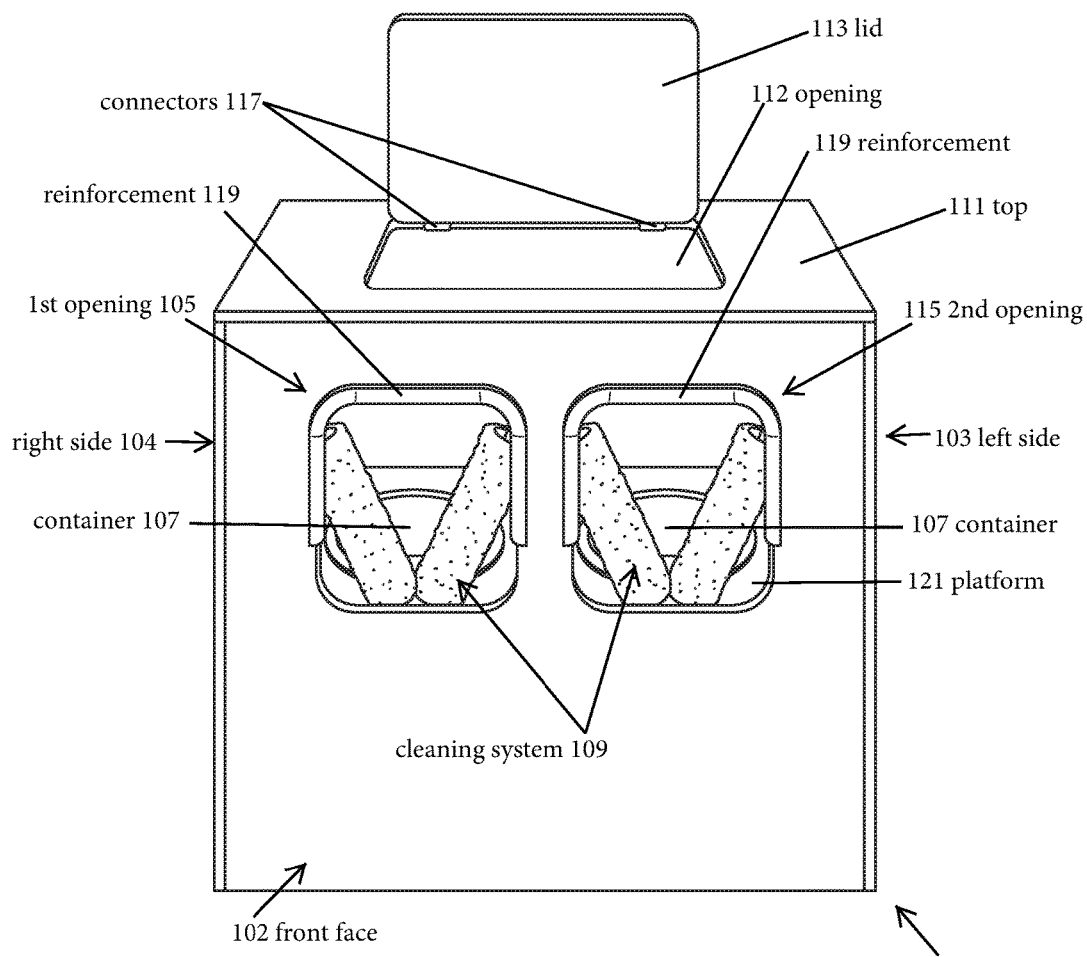
FIG. 1 is a front perspective view of the clean feeder device.

Shown in FIG. 1 is front perspective view of an animal clean feeder device 100. The clean feeder device 100 comprises a feeding structure 101 having a front face 102 with at least a first opening 105, a left side 103 oppositely disposed a right side 104, and a cleaning system. The device 100 may further comprise a platform 121 and a container 107 positioned within the feeding structure 101 and in front of the first opening 105. As shown in FIG. 1, in an additional embodiment the clean feeder device may also comprise a top 111 having an opening 112 with a lid 113 having connectors 117.

As shown in FIG. 1, the clean feeder device 100 may further comprise a second opening 115 on the front face of the feeding structure. The second opening 115 may be on the front face 102 (as shown) or on the left side 103 or right side 104, and may also have a container 107 positioned within the feeding structure 101 and in front of the second opening 115. Additionally, as shown in FIG. 1 the openings 105 and 115 may have reinforcement 119.

The shape of the feeding structure 101 shown in FIG. 1 is rectangular; however, as will be understood by one skilled in the art, a variety of any shapes may be used for the structure 101 of the device, including but not limited to, square, circle, oval, triangle, trapezium, diamond, rhombus, parallelogram, pentagon, hexagon, heptagon, octagon, nonagon, and decagon. The structure may be placed against a wall, affixed to a wall, or be freestanding. Means for affixing or attaching the device to the wall are known to those skilled in the art and may include, for example, VELCRO® or a hook and loop fastener, screws, brackets or adhesive materials. The structure may further comprise a back face oppositely disposed to the front face.

As will be understood by one skilled in the art, a variety of materials may be used to construct the structure 101 of the clean feeder device 100, including but not limited to, wood, plywood, plasterboard, wallboard, gypsum board, metal, including but not limited to copper, bronze, steel and aluminum or others, stone, plastic, and fiberglass, fabric.

As shown in FIG. 1, the first opening 105 and second opening 115 are essentially square shaped with rounded edges and corners, however, a variety of shapes may be used for the first opening or second or more openings, including but not limited to, square, rectangle, circle, oval, triangle, trapezium, diamond, rhombus, parallelogram, pentagon, hexagon, heptagon, octagon, nonagon, and decagon. As will be understood by one skilled in the art, the size and shape of the first opening or second or more openings may be customized for the size and shape of the head of the animal or animals, which the device is intended to be used for. Additionally, as shown in FIG. 1 openings 105 and 115 are partially reinforced 119 to protect both the feeding structure from damage and the animal, however as will be understood by one skilled in the art the openings may not require reinforcement or may require complete reinforcement.

As will be understood by one skilled in the art, the device may have one, two, three or more openings which may be located on the front face, the right or left side or even the back side, or in an additional embodiment, additional openings may be provided on more than one side of the feeding structure.

As shown in FIG. 1 an embodiment of the present disclosure provides a feeding structure 101 that may comprise a top 111 with an opening 112 and a lid 113 configured to the size and shape of the opening 112 on the top 111. The lid 113 may be attached to the top 111 by connectors 117 so that the lid 113 can be opened and closed. Any number of connectors may be used, for example, hinges. As will be understood by one skilled in the art, the hinged lid 113 enables one to place food or liquid into the structure 101 to induce an animal to insert their head through the opening. The food or liquid may be placed, for example, in the containers within the structure 101. Though not shown in FIG. 1, the hinged lid 113 may further comprise a knob or handle (see FIG. 4 for example). The hinged lid 113 may further comprise a latch, lock, or magnetic closure. The hinged lid may further comprise pistons or other means for controlled opening and closing.

Figure 2:
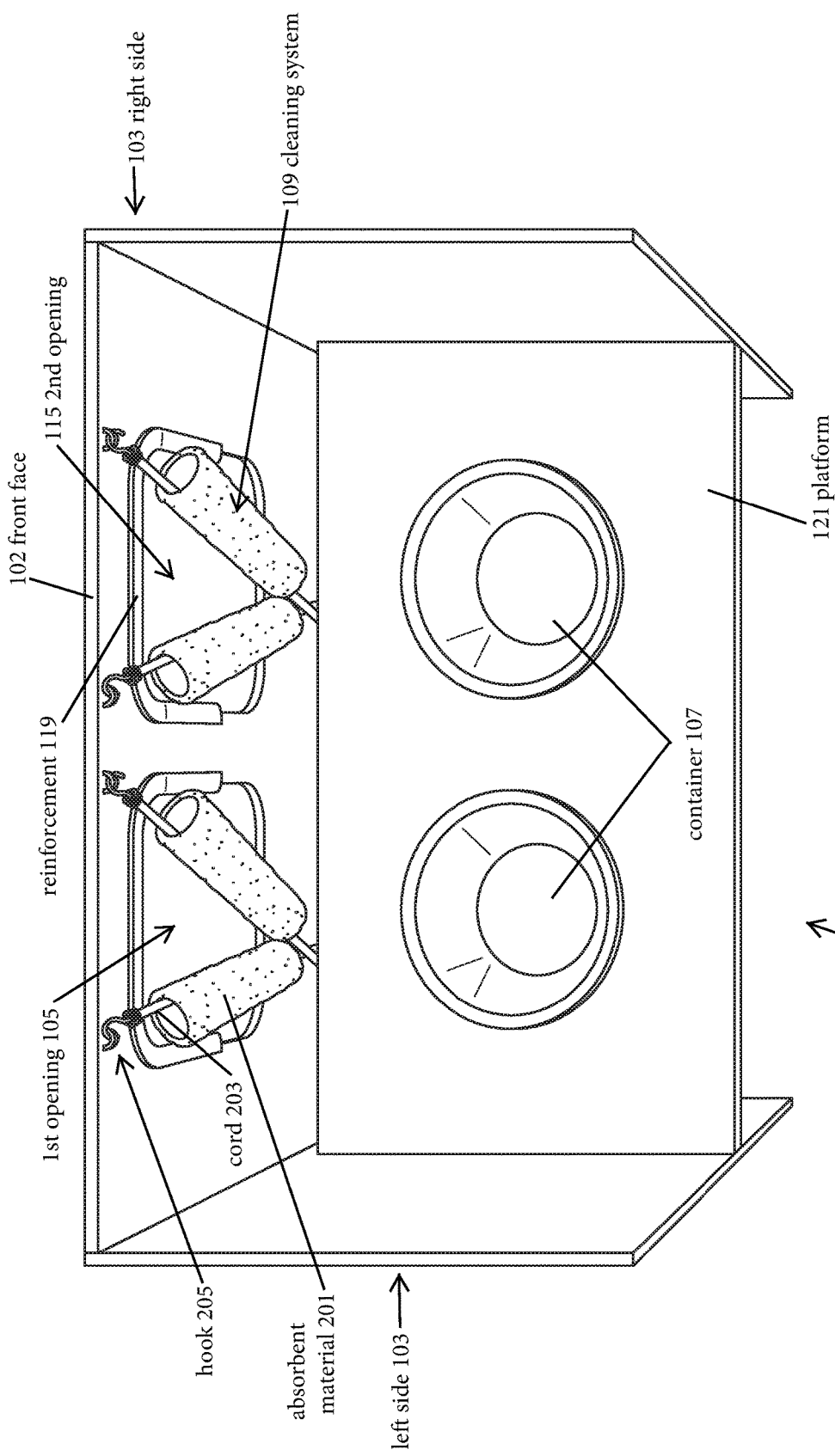
FIG. 2 is a top perspective view of the clean feeder device.

Shown in FIG. 2 is a top perspective view of the clean feeder device 200. FIG. 2 shows the cleaning system 109, which includes an absorbent material 201, and a means for positioning the absorbent material in a desired location, such as a cord 203. There are a variety of means for positioning the absorbent material in a desired location, for example, a cord 203, bungee, string, rope, metal wire, elastic string, etc. Additionally, the absorbent material may include an additional structure to facilitate positioning, such as a cardboard tube. A number of means for attaching the cleaning system to the structure may be used, for example, a hook 205, a hook and eye bolt, a hook and U-connection, nails, wire rope clips, snap hooks, buckles, etc. Additionally, while the cleaning system 109 shown in FIGS. 1 and 2 is positioned within the feeding structure 101 spanning across the openings, the cleaning system 109 may be positioned on the outside of the structure 101 or within the opening itself.

As will be understood by one skilled in the art, the cleaning system 109 is not rigid, but allows for some elasticity or give, via either the absorbent material itself or the means for positioning and attaching the absorbent material. For example, in FIG. 1 a cord is used as the means for positioning the absorbent material, a roller. The cord is threaded through the roller, and then the cord is attached to the structure. This allows for the roller to spin and slide within the opening of the clean feeder structure.

The absorbent material 201 in FIGS. 1 and 2 is shown configured as a roller, wherein two rollers are arranged in a V-shape on the inside of the structure 101, however any configuration or shape may be used. For example, the absorbent material may be substantially the same shape as the opening. The absorbent material may surround the entire opening, or may be attached to the structure so that it spans only one part of the opening (see FIG. 3 for example).

Any absorbent material, both natural and synthetic, may be used. For example, synthetic and natural sponges, and materials containing cellulose, such as products derived from wood, green plants, and algae. Examples of absorbent materials containing cellulose include, but are not limited to, cotton, hemp, bamboo, and wood. Other absorbent materials that may be used include polyester and wool. Examples of products containing the above materials that may be used in the clean feeder device of the present disclosure include, but are not limited to, paper products, such as paper towels, cardboard, toilet paper, and tissue paper, various fabrics such as cotton, polyester, microfiber, wool, etc., soaker pads (such as those used to absorb liquid and odours from meat and produce), towels, and paint rollers, such as those having lamb's wool, synthetic, or foam covers. Some of the materials listed above also absorb odors and resist to microbial growth.

Additives may be added to the absorbent material. For example, those used to prevent fleas, ticks, lice, and mosquitoes, including but not limited to, pyrethrins, pyrethroids, fipronil, methoprene, pyriprozyfen, fenoxycarb, methylcarbamate, imidacloprid, amitraz, selamectin, nitenpyram, citrus extracts, sodium lauryl sulfate, spinosad, and permethrin. Additional compounds may be added to increase the effectiveness of flea, tick, lice and mosquito prevention. Other topical compounds may be added to the absorbent material to treat various conditions and ailments of the animal.

Figure 3:
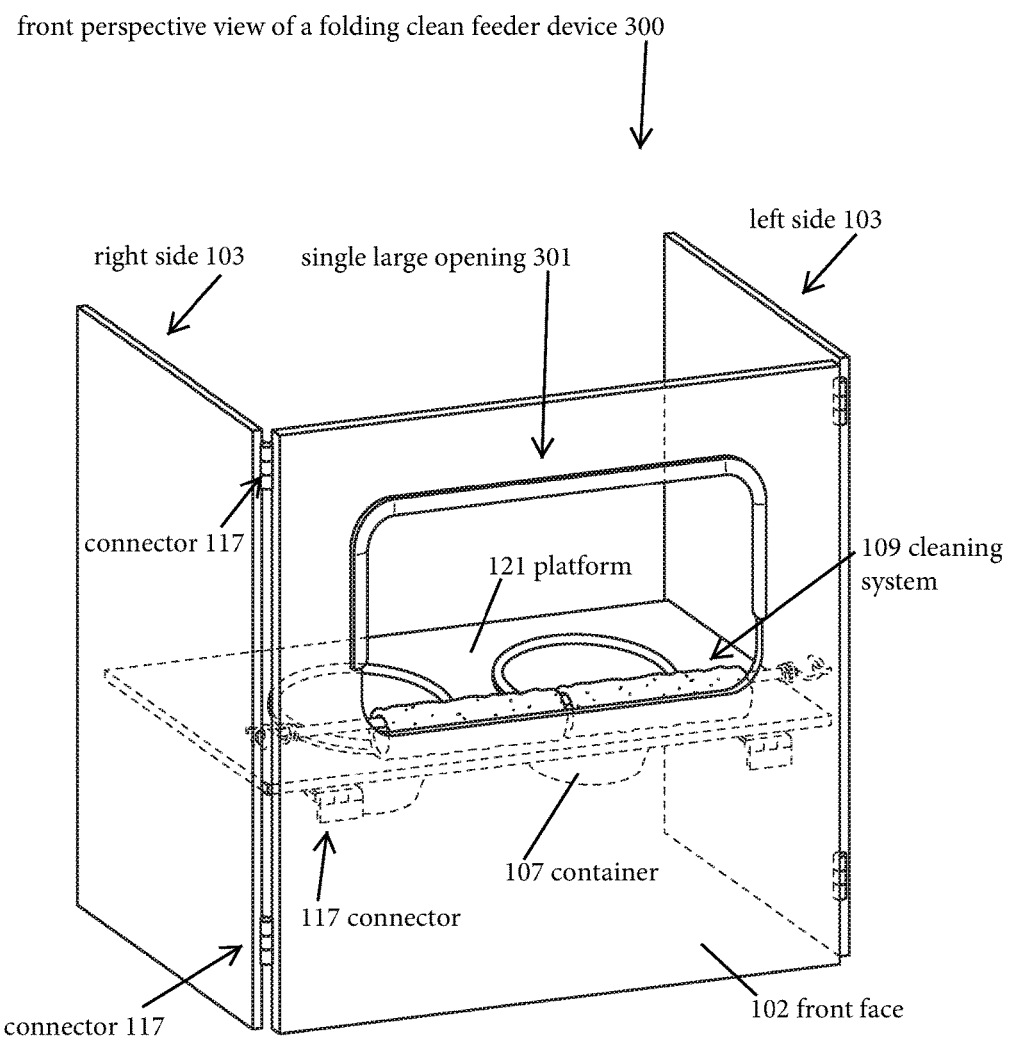
FIG. 3 is a front perspective view of a folding clean feeder device.

Shown in FIGS. 1 and 2, a container 107 may be placed on top of the platform 121 or the platform 121 may comprise a hole such that the container 107 fits and is held within the hole (see FIG. 3 for example). The container 107 may be separate from the platform 121, or may be permanently or semi-permanently attached to the platform 121.

FIG. 3 shows a front perspective view of a folding clean feeder device 300 where the device is designed to fold flat for easy storage. In this configuration, connectors 117, for example hinges, are placed at a connection point between each side 103, 104 and the front face 102. A separate set of connectors 117 operably attach the platform 121 to the front face 102, allowing the platform 121 and each side 103, 104 to fold flat against the front face 102.

Also shown in FIG. 3 is a single large opening 301 that allows access to two containers 107. As will be understood by one skilled in the art, the device may be customized to have additional openings on the front face or on the sides. The opening 301 also shows an alternate position for the cleaning system 109. Here, the cleaning system 109 is attached to the structure so that the absorbent material runs along the base of the opening. Similar to the example shown in FIG. 2, there are a variety of means for positioning the absorbent material in a desired location, for example, cord, bungee, string, rope, metal wire, elastic string, etc. Additionally there are a number of means for attaching the cleaning system to the structure, for example, a hook, a hook and eye bolt, a hook and U-connection, nails, wire rope clips, snap hooks, buckles, etc.

EXAMPLES

The following examples are provided to illustrate further the various applications of the present invention and are not intended to limit the invention beyond the limitations set forth in the appended claims.

Example 1

Figure 4:
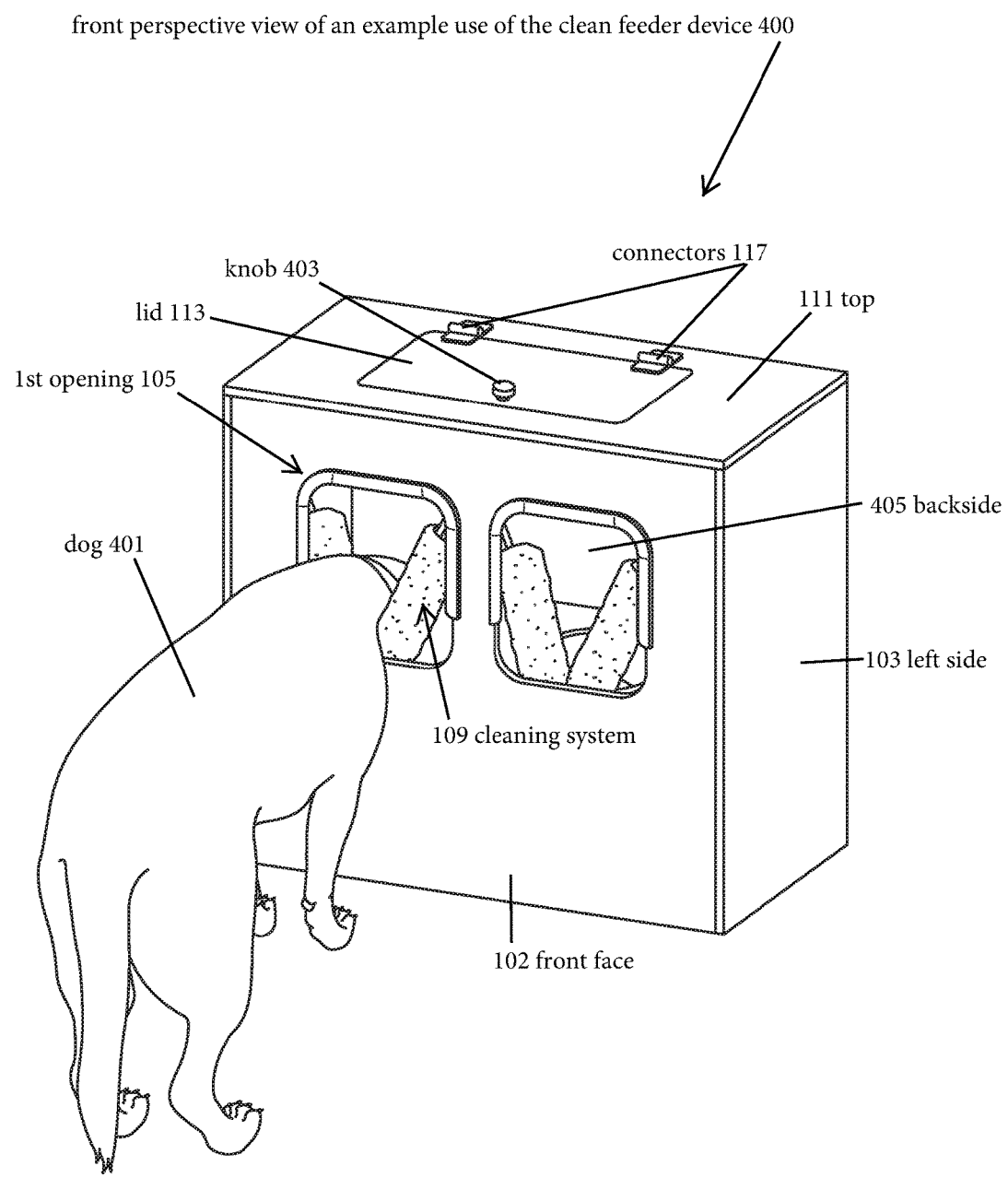
FIG. 4 is a front perspective view of an example use of the clean feeder device.

FIG. 4 shows a front perspective view of an example use of the clean feeder device 400. As shown in FIG. 4, a dog 401 inserts their head through the first opening 105 after being induced to do so, for example to access food or water from a container. As the dogs head exits the opening 105 of the feeding structure, excess food particles, water, or slobber are wiped off by the cleaning system 109. The example shown in FIG. 4 has a backside 405 oppositely disposed of the front face 102 of the feeding structure. FIG. 4 also shows the device having a top 111 with a lid 113 having connectors 117, for example hinges, and a knob 403.

While a dog is shown in FIG. 4, the clean feeder device of the present disclosure may be used for variety of animals, including but not limited to, dogs, cats, horses, cattle, ox, goats, sheep, donkeys, mules, camels, llamas, alpacas, and pigs.

Example 2

Figure 5:
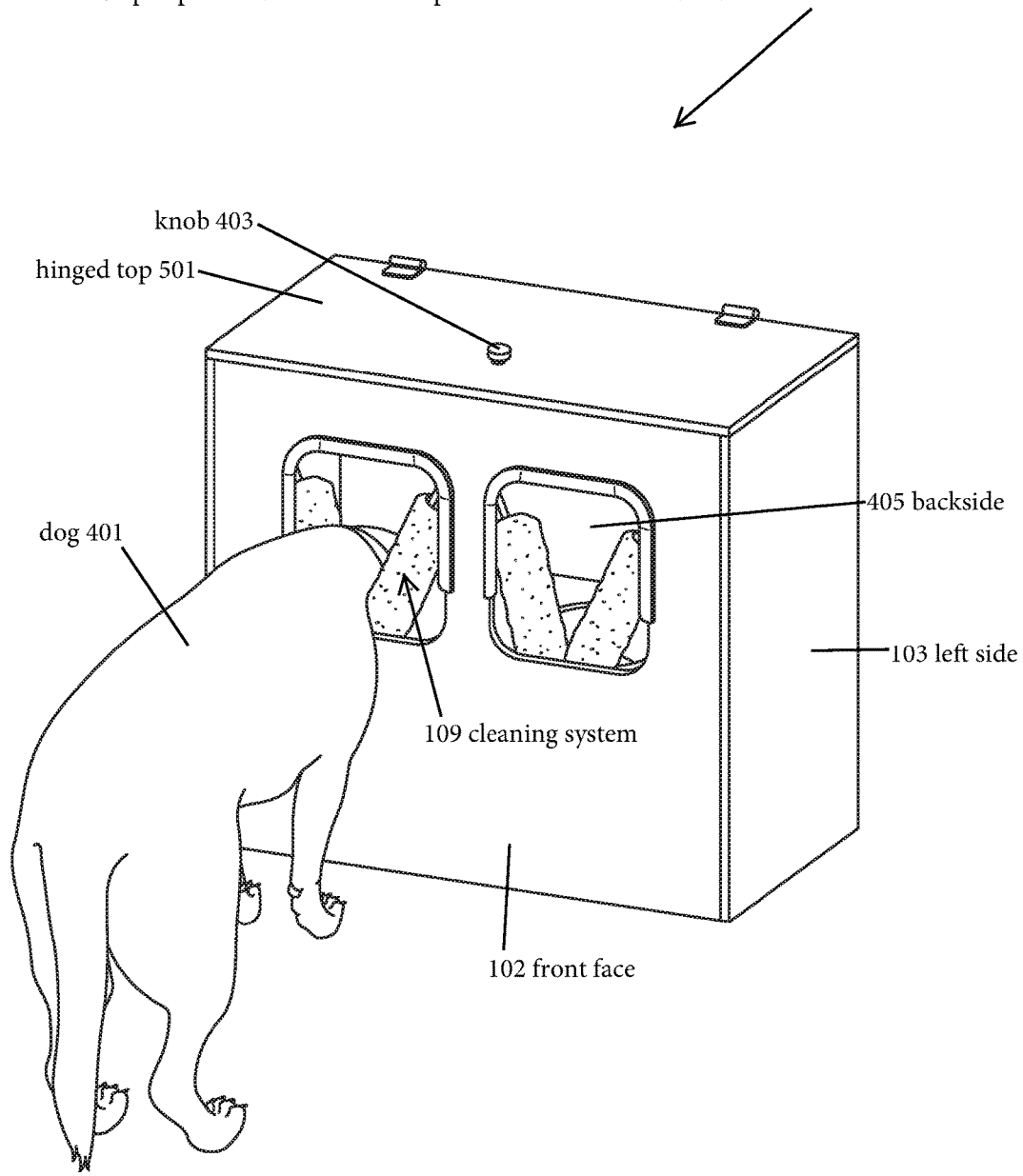
FIG. 5 is a front perspective view of an example use of the clean feeder device.

FIG. 5 shows a front perspective view of an example use of the clean feeder device 500. As shown in FIG. 5, a dog 401 inserts their head through the first opening 105 of the feeding structure after being induced to do so, for example to access food or water from a container. As the dogs head exits the opening 105, excess food particles, water, or slobber are wiped off by the cleaning system 109. The example shown in FIG. 5 has a backside 405 oppositely disposed of the front face 102. FIG. 5 also has a hinged top 501 so that the entire top lifts so that one may access the inside of the structure, for example to place food or water in a container. The hinged top 501 may further comprise a latch, lock, or magnetic closure. The hinged top 501 may further comprise pistons or other means for controlled opening and closing.

Example 3

Figure 6:
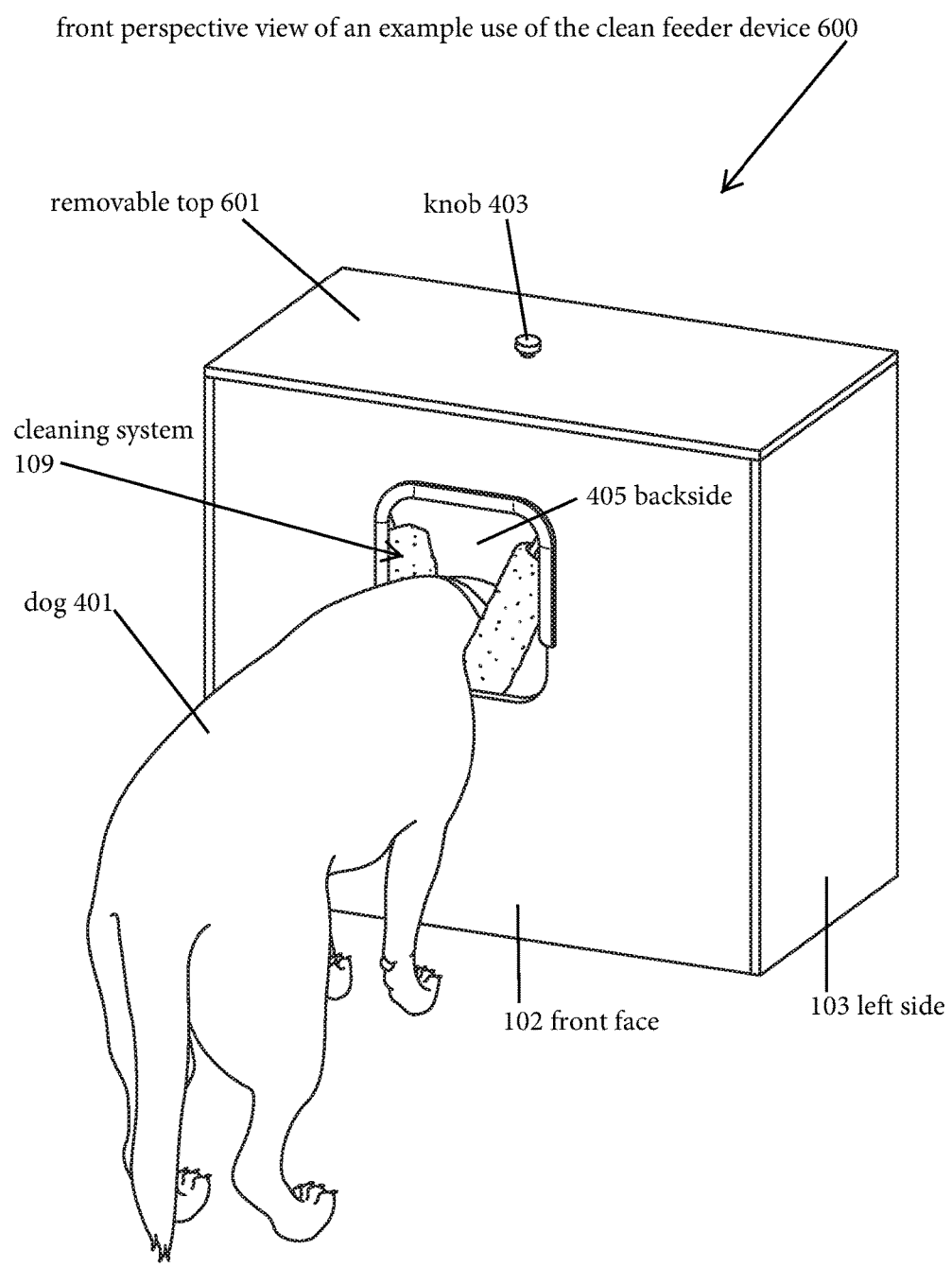
FIG. 6 is a front perspective view of an example use of the clean feeder device.

FIG. 6 shows a front perspective view of an example use of the clean feeder device 600. A dog 401 inserts their head through the first opening 105 of the feeding structure after being induced to do so, for example to access food or water from a container. As the dogs head exits the opening 105, excess food particles, water, or slobber are wiped off by the cleaning system 109. The example shown in FIG. 6 has a backside 405 oppositely disposed of the front face 102. FIG. 6 also shows the device having a single opening, however as will be understood by one skilled in the art the clean feeder device may comprise a second or more opening, as well as additional openings on the sides. The example device shown in FIG. 6 has a removable top 601 so that one may access the inside of the structure.

Example 4

Figure 7:
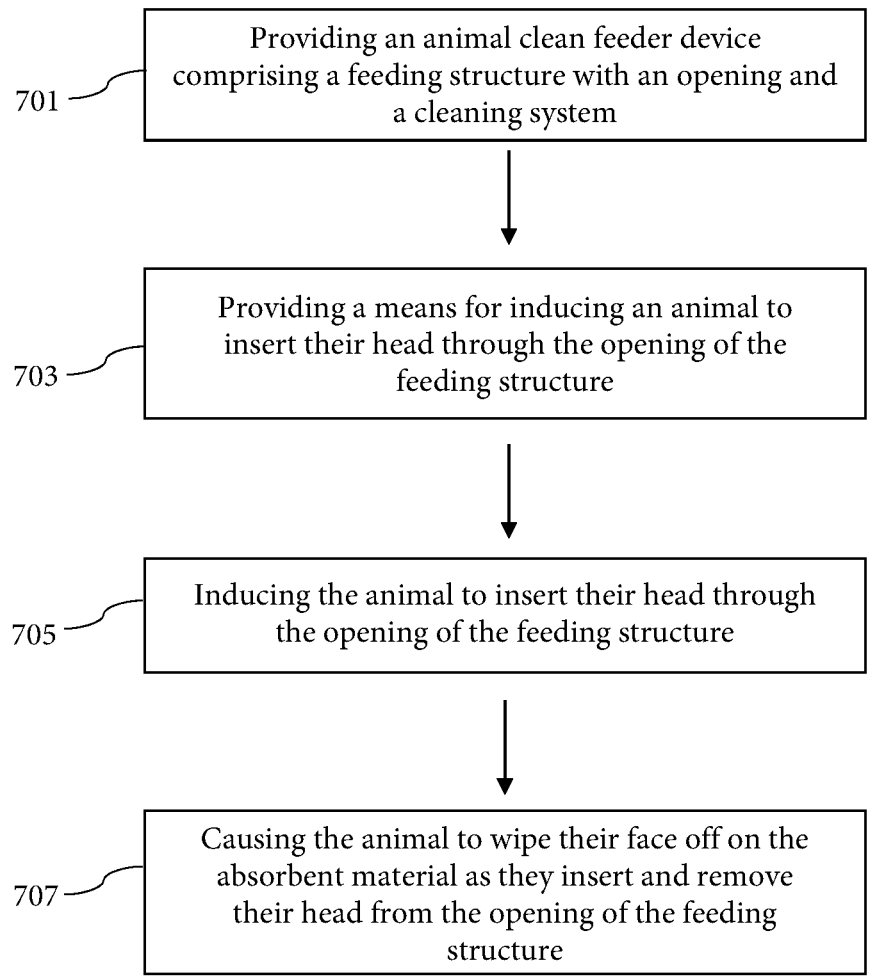
FIG. 7 is a flow diagram for a method of cleaning an animal's face.

FIG. 7 shows a flow diagram for a method of cleaning an animal's face. In step 701, an animal clean feeder device comprising a feeding structure and a cleaning system is provided. In step 703, a means for inducing an animal to insert their head through the opening of the feeding structure is provided. In step 705, an animal is induced to insert their head through the opening of the feeding structure, causing the animal to wipe their face off on the absorbent material as they insert and remove their head from the opening of the feeding structure (step 707).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An animal clean feeder device comprising:
a feeding structure having a front face, a left side and an oppositely disposed right side defining an interior space, wherein said interior space is accessible through at least a first opening in said front face, left side or right side;
wherein said front face is operably attached to said left side and said right side by two or more hinges;
wherein at least a portion of a peripheral boundary of said at least a first opening comprises reinforcement, and wherein said at least a first opening is large enough for a domestic animal to insert its head through said at least a first opening;
a cleaning system, wherein said cleaning system comprises at least one absorbent material chosen from paper towels, cardboard, toilet paper, facial tissue paper, cotton, polyester, microfiber, wool, soaker pads, towels, foam, and paint rollers;
a means for operably attaching and positioning said cleaning system to said feeding structure, wherein said means for operably attaching and positioning said cleaning system comprises at least one elastic structure, wherein said at least one elastic structure transverses the interior of said at least one absorbent material, wherein said at least one absorbent material is positioned in a V-shape within said interior space and traverses said at least a first opening such that said at least one absorbent material is biased against said domestic animal's face and said domestic animal's face contacts said cleaning system when it inserts and withdraws its head through said first opening;

a platform, wherein said platform is within said interior space and is operably attached to said front face by hinges; and
wherein said hinges operably attaching said front face, said left side, said right side, and said platform allow said feeding structure to fold flat for easy storage.

2. The device of claim 1, wherein said feeding structure further comprises a topside, wherein said topside is operably coupled to said front face by at least one hinge and is foldable.

3. The device of claim 2, wherein said topside comprises an opening and a lid.

4. The device of claim 1, wherein said feeding structure further comprises a second or more openings, wherein said second or more openings are located on a side chosen from said front face, said left side, or said right side.

5. A system for cleaning an animal's face comprising:
a feeding structure having a front face, a left side and an oppositely disposed right side defining an interior space, wherein said interior space is accessible through at least a first opening in said front face, left side or right side;
wherein said front face is operably attached to said left side and said right side by two or more hinges;
wherein at least a portion of a peripheral boundary of said at least a first opening comprises reinforcement, and wherein said at least a first opening is large enough for a domestic animal to insert its head through said at least a first opening;
at least one container, wherein said at least one container is positioned within said interior space of said feeding structure and in front of said at least a first opening;
a cleaning system, wherein said cleaning system comprises at least one absorbent material chosen from paper towels, cardboard, toilet paper, facial tissue paper, cotton, polyester, microfiber, wool, soaker pads, towels, foam, and paint rollers; and
a means for operably attaching and positioning said cleaning system to said feeding structure, wherein said means for operably attaching and positioning said cleaning system comprises at least one elastic structure, wherein said at least one elastic structure transverses the interior of said at least one absorbent material, wherein said at least one absorbent material is positioned in a V-shape within said interior space and traverses said at least a first opening such that said at least one absorbent material is biased against said domestic animal's face and said domestic animal's face contacts said cleaning system when it inserts and withdraws its head through said first opening; and
wherein said hinges operably attaching said front face, said left side, and said right side allow said feeding structure to fold flat for easy storage.

6. The system of claim 5, wherein said feeding structure further comprises a topside, wherein said topside is operably coupled to said front face by at least one hinge and is foldable.

7. The system of claim 6, wherein said topside further comprises an opening and a lid.

8. The system of claim 5, wherein said structure further comprises a platform within said interior space, wherein said platform is operably attached to the front face of said feeding structure by at least one hinge, and wherein said platform is foldable and may be elevated to position said at least one container in front of said at least a first opening.

9. The system of claim 5, wherein said structure further comprises a second or more openings, wherein said second or more openings are located on a side chosen from said front face, said left face, or said right side.

10. A method for cleaning an animal's face comprising:
providing an animal clean feeder device comprising:
a feeding structure having a front face, a left side and an oppositely disposed right side defining an interior space, wherein said interior space is accessible through at least one opening in said front face, left side or right side;
wherein said at least one opening is large enough for a domestic animal to insert its head through said at least one opening and wherein at least a portion of a peripheral boundary of said at least one opening comprises reinforcement;
a cleaning system, wherein said cleaning system comprises at least one absorbent material chosen from paper towels, cardboard, toilet paper, facial tissue paper, cotton, polyester, microfiber, wool, soaker pads, towels, foam, and paint rollers;
a means for operably attaching and positioning said cleaning system to said feeding structure, wherein said means for operably attaching and positioning said cleaning system comprises at least one elastic structure, wherein said at least one elastic structure transverses the interior of said at least one absorbent material, wherein said at least one absorbent material is positioned in a V-shape within said interior space and traverses said at least one opening such that said at least one absorbent material is biased against said domestic animal's face and said domestic animal's face contacts said cleaning system when it inserts and withdraws its head through said at least one opening;
providing a means for inducing said domestic animal to insert its head through said at least one opening;
inducing said domestic animal to insert its head through said at least one opening; and
causing said domestic animal to wipe its face off on said at least one absorbent material as it inserts and removes its head from said at least one opening.

11. The method of claim 10, wherein said means for inducing said domestic animal to insert its head through said at least one opening is food or water.

12. The method of claim 11, wherein said food or water is in a container, and wherein said container is positioned within said interior space of said feeding structure and in front of said at least one opening.

13. The method of claim 10, wherein said feeding structure further comprises a topside.

* * * * *